Figure 1:
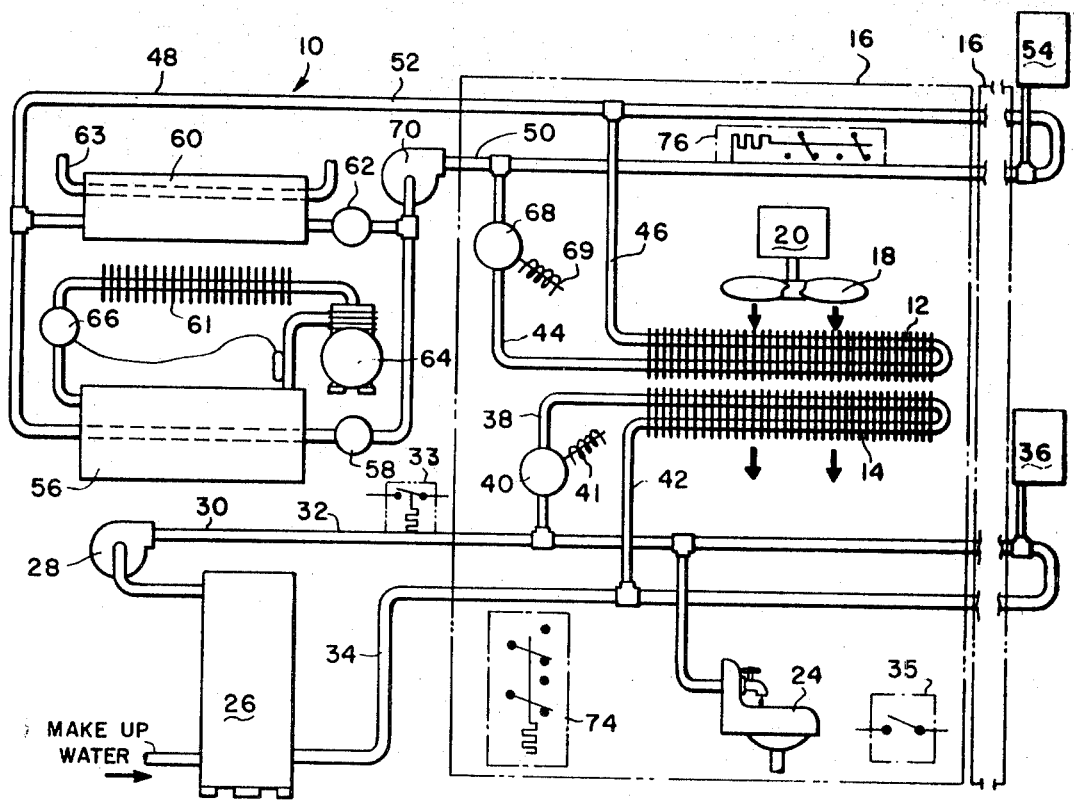

United States Patent

[11] 3,627,030

[72] Inventor John W. Lorenz
   La Crosse, Wis.
[21] Appl. No. 312
[22] Filed Jan. 2, 1970
[45] Patented Dec. 14, 1971
[73] Assignee The Trane Company
   La Crosse, Wis.

[54] HEATING, COOLING, DEHUMIDIFYING, AIR-CONDITIONING SYSTEM CONTROL
8 Claims, 2 Drawing Figs.

[52] U.S. Cl. .................................................. 165/22
[51] Int. Cl. .................................................. F24f 3/00
[50] Field of Search .................................. 165/22, 16, 48, 50, 64, 26-30

[56] References Cited
UNITED STATES PATENTS
2,091,562  8/1937  Palmer .......................... 165/16
2,492,757  12/1949  Meek ............................ 165/50

*Primary Examiner*—Charles Sukalo
*Attorneys*—Arthur O. Andersen and Carl M. Lewis ABSTRACT: A zone-type heating, cooling, dehumidifying air-conditioning system is shown wherein each zone or unit is provided with a primary heat exchanger circuit and a secondary heat exchanger circuit. The primary heat exchanger is arranged to be supplied with warm water during the heating season and chilled water during the cooling season. The secondary heat exchanger is arranged to be supplied with domestic warm water. Each of the heat exchangers is provided with a control valve for controlling the circulation of heat exchange liquid therethrough. A fan is arranged to circulate air of the respective zone serially in heat exchange relationship with the primary heat exchanger and the secondary heat exchanger. A zone control system responsive to the temperature and humidity of the respective zone and the temperature of the heat exchange fluid being supplied to the heat exchangers controls the operation of the valves. Where domestic warm water is used for obtaining dehumidification, an overriding control prevents the use of domestic warm water for dehumidification in excess of the supply to thereby maintain the desired domestic warm water temperature.

Patented Dec. 14, 1971

3,627,030

INVENTOR.
JOHN W. LORENZ
BY
Carl M. Lewis
ATTORNEY

HEATING, COOLING, DEHUMIDIFYING, AIR-CONDITIONING SYSTEM CONTROL

The present invention relates to air-conditioning systems utilizing warm and chilled water for heating, dehumidifying, and cooling, buildings, apartments, hotels, motels, etc. More particularly it relates to an air-conditioning system for a zone or space in which two heat exchangers are utilized to effect the heating and dehumidifying functions and one of the two heat exchangers is utilized to effect the cooling function. A thermostat controls the operation of each of the heat exchangers in response to the temperature of the conditioned space or zone. A humidistat controls the operation of the cooling heat exchanger in response to the humidity of the conditioned space. The action of the thermostat with respect to the primary heat exchanger, that is the heat exchanger performing both heating and cooling functions, is reversed in response to a change in the temperature of the water being circulated to the primary heat exchanger from cool to warm and vice versa so that the same thermostat controls both the heating and cooling functions of the air-conditioning system. The humidistat overrides the action of the thermostat with respect to the primary heat exchanger in response to the humidity of the conditioned space to obtain humidity control using domestic warm water in the secondary heat exchanger.

It is thus the object of this invention to provide an air-conditioning system employing a primary heating and cooling heat exchanger and an auxiliary or secondary heat exchanger with a control system for operating each of the heat exchangers automatically in response to the temperature and humidity of the conditioned space and the temperature of the heat exchange fluid supplied to the primary heat exchanger.

It is another object of this invention to provide the aforedescribed air-conditioning system with two distinct heat exchange fluid sources, one of which is the domestic warm water supply to the building or the like.

It is a further object of this invention to provide an air-conditioning system employing a primary heating and cooling heat exchanger and an auxiliary or secondary heating heat exchanger using domestic warm water with a control system for operating each of the heat exchangers automatically in response to the temperature and humidity of the conditioned space and the temperature of the heat exchange fluid supplied to the primary and secondary heat exchangers.

Figure 2:
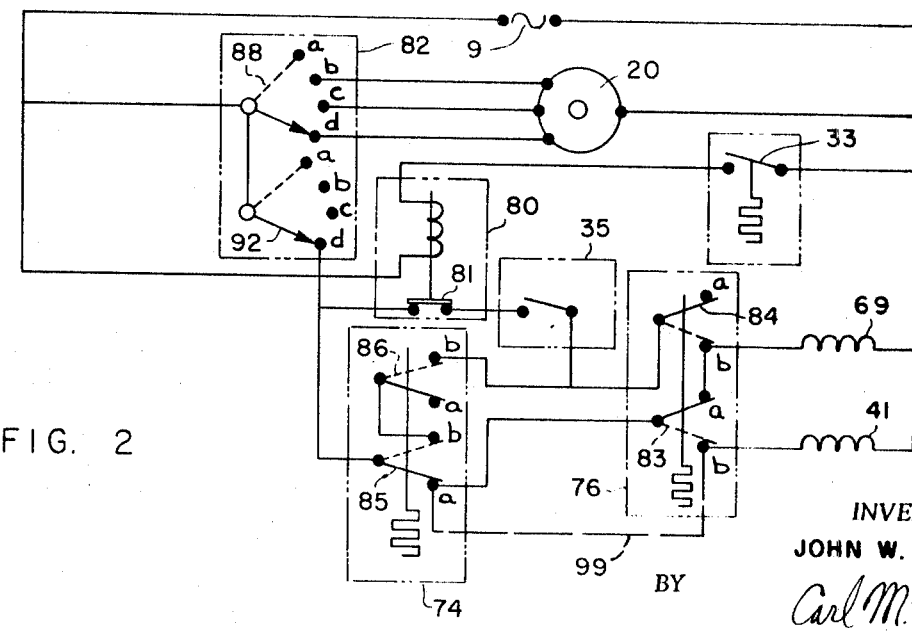

Other objects and advantages will become apparent as this specification proceeds to describe the invention with reference to the drawing in which:

FIG. 1 is a schematic of the air-conditioning system incorporating the instant invention; and FIG. 2 is an electrical control circuit for controlling that portion of the air-conditioning system of FIG. 1 directly associated with one zone thereof.

Now referring to FIG. 1 of the drawings it will be seen that the air-conditioning system 10 includes a primary heat exchanger 12 and a secondary heat exchanger 14 disposed in heat exchange relationship with the conditioned space or zone 16. Each heat exchanger has tubes for conducting a heat exchange liquid therethrough. A fan 18 driven by a three-speed motor 20 is arranged to pass air serially over heat exchangers 12 and 14 as indicated whereby heat exchange is effected between the air of the conditioned space or zone 16 and the liquid passing within the tubes of heat exchangers 12 and 14.

A domestic warm water supply is provided for lavatory 24 and the like within the zone 16 and includes a hot water heater 26 and a pump 28 arranged in a closed domestic warm water loop or circuit 30 having a domestic warm water supply conduit 32 and a domestic warm water return conduit 34 which may serve plural zones 16. If desired warm water loop or circuit 30 may be provided with an appropriate expansion tank 36. A branch inlet conduit 38 connects the domestic warm water supply conduit 32 with the inlet of heat exchanger 14. A solenoid-operated valve 40 is disposed within branch inlet conduit 38 to interrupt the supply of domestic warm water to heat exchanger 14. Valve 40 is opened by energization of the solenoid 41 thereof to permit heat exchange fluid from supply conduit 32 to flow in inlet conduit 38 to the inlet of heat exchanger 14. Water is returned from the heat exchanger 14 through branch outlet conduit 42 which connects to domestic warm water return conduit 34.

Heat exchanger 12 is connected by way of a branch inlet conduit 44 and a branch outlet conduit 46 to a second closed loop or water circuit 48 which has a supply conduit 50 and a return conduit 52 which may be arranged to serve plural zones 16. An expansion tank 54 may be provided for loop 48 if desired.

Supply conduit 50 is connected to the outlet of water chiller 56 by way of valve 58 and to the outlet of water heater 60 by way of valve 62. The water within heater 60 may be heated by indirect heat exchange with steam or the like passing through conduit 63. Return conduit 52 connects to water heater 60 and water chiller 56 for returning water from the loop 48. A refrigeration system having a compressor 64 is arranged to discharge hot refrigerant gas to condenser 61 where it is cooled and condensed. The condensed refrigerant is throttled to a lower pressure via expansion valve 66 and conducted to water chiller 56 where it is evaporated by indirect heat exchange with the water within water chiller 56 thereby cooling the water therein. The thus evaporated refrigerant is returned to compressor 64 for another cycle.

A pump 70 in supply conduit 50 circulates the water from either water chiller 56 or water heater 60 through the heat exchange loop 48. Branch inlet conduit 44 has a solenoid operated valve 68 for interrupting the supply of heat exchange liquid from supply conduit 50 to the inlet of heat exchanger 12. Valve 68 is opened by energization of the solenoid 69 thereof to permit the exchange fluid from supply conduit 50 to flow to the inlet of heat exchanger 12 and be returned by branch outlet conduit 46 to return conduit 52.

A double-pole, double-throw, two-stage thermostat 74 is arranged to sense the temperature within condition space or zone 16. A second double-pole, double-throw, single-stage thermostat 76 is arranged to sense the temperature of the water flowing within the supply conduit 50. A third single-pole, single-throw thermostat 33 is disposed to sense the temperature of the water leaving domestic hot water heater 26 and arranged to close upon sensing a domestic warm water temperature below a predetermined value. An automatic humidistat having a switch 35 disposed in zone 16 is arranged to close in response to a demand for dehumidification. With pump 70 operating, warm water passes through loop 48 when valve 62 is opened and valve 58 is closed, and chilled water passes through loop 48 when valve 58 is opened and valve 62 is closed. In the system herein disclosed chilled water would be supplied loop 48 throughout the cooling season and intermediate seasons while warm water would be supplied loop 48 during the winter or heating season only. The operation of valves 62 and 58 can be made automatic if desired.

OPERATION

The operation of the air-conditioning system of FIG. 1 is best understood by reference to the electrical circuit shown in FIG. 2. In addition to the humidistat 35, and the thermostats 33, 74, and 76, the electrical control circuit includes a double-pole, quadruple-throw, rotary gang fan control switch 82 and a normally closed relay 80. Each of the relays 80 of the plural zones 16 may be connected in series with a single thermostat 33. It will be assumed that pump 28 circulates warm water through loop 30 at all times. Assume that valve 62 is open and valve 58 is closed and that pump 70 is circulating warm water through loop 48 whereby switches 83 and 84 of water thermostat 76 take the position bridging contacts *a* as shown in solid line in FIG. 2. Let it also be assumed that the switch of thermostat 33 is open in response to sufficiently high temperature within supply conduit 30 for purposes of domestic usage.

Upon rotating fan control 82 from the dotted line position of switches 88 and 92 bridging throw *a* to the position of switches 88 and 92 bridging throw *d* shown in full line, a first circuit between line 1 and line 2 of alternating current power source 9 is established including switch 88 and motor 20. It will be appreciated that throws *b*, *c* and *d* of fan control 82 represent manually selected low-, medium-, and high-speed connections to motor 20. Thus, fan 20 will be operated at high speed in the solid line position shown for switch 88. Should there be a demand for heating within the conditioned space 16, switches 85 and 86 of thermostat 74 will be moved the full line position bridging throws *a* thereby establishing a second circuit between line 1 and line 2 including switch 92 of fan control 82, switch 85 of thermostat 74, switch 83 of thermostat 76, and solenoid 69 of valve 68 whereby valve 68 is energized to the open position. Upon the opening of valve 68 warm water flows from supply conduit 50, through inlet conduit 44, through heat exchanger 12, and through outlet conduit 46 to return conduit 52 whereby warm water is circulated through heat exchanger 12 and the air passed over the heat exchanger 12 by fan 18 as warmed to raise the temperature of the conditioned space 16. When the temperature in the conditioned space 16 rises above a predetermined value, switch 85 of thermostats 74 moves to throw *b* as shown in dotted line position thereby interrupting the aforedescribed circuit including solenoid 69, thus deenergizing solenoid 69 and closing valve 68. The closure of valve 68 interrupts the flow of warm heat exchange fluid through heat exchanger 12. Should the space 16 again become excessively cold, the system will repeat the above-described cycle energizing solenoid 69 of valve 68 whereby the conditioned space is warmed. At all times when warm water is being circulated in loop 48, no circuit is established through solenoid 41 to open valve 40 and set heat exchanger 14 in operation.

Now let it be assumed that valve 62 is closed, valve 58 opened, pump 70 is operating and compressor 64 is operating to chill the water within water chiller 56. Thus chilled water is circulated through loop 48. In such event switches 83 and 84 of thermostat 76 assume the position bridging throws *b* shown in dotted line in FIG. 2. When fan control 82 is rotated from the dotted line position of switches 88 and 92 to the solid line position of switches 88 and 92 a first circuit is established including switch 88 and motor 20 thereby energizing fan 18. Should the temperature in the conditioned space rise above a predetermined value, switches 85 and 86 of thermostat 74 will bridge throws *b* as shown in dotted line position in FIG. 2. Thus a second circuit is established between line 1 and line 2 including switch 92 of fan control 82, switches 85 and 86 of thermostat 74, switch 84 of thermostat 76, and solenoid 69 of solenoid valve 68 whereby valve 68 is moved to the open position. With valve 68 open, chilled water passes from supply conduit 50 through branch inlet conduit 44 to heat exchanger 12, and from heat exchanger 12 through branch outlet conduit 46 to return conduit 52 whereby the air within the conditioned space 16 is cooled. When the cooling demand of space 16 is satisfied, switch 86 of thermostat 74 will move to the solid line position thereby interrupting the aforedescribed circuit through solenoid 69, thus closing valve 68.

Should the temperature within space 16 continue to fall below a predetermined value, switch 85 of thermostat 74 will also move to the solid line position thereby establishing another circuit between line 1 and line 2 including switch 92 of fan control 82, switch 85 of thermostat 74, switch 83 of thermostats 76 and solenoid 41 of solenoid valve 40 thereby opening valve 40 to allow domestic warm water to pass from supply conduit 32, through branch inlet conduit 38 to heat exchanger 14, and from heat exchanger 14 through branch outlet conduit 42 back to return conduit 34. Space 16 is thus warmed by secondary or auxiliary heat exchanger 14.

Should there be a demand for dehumidification of conditioned space 16 when chilled water is being circulated through circuit 48 thermostat, switch 35 is closed and a circuit between line 1 and line 2 is established including switch 92 of fan control 82, switch 81 of relay 80, thermostat switch 35, switch 84 of thermostat 76, and solenoid 69 of solenoid valve 68 whereby valve 68 is moved to the open position. With valve 68 open, chilled water passes from supply conduit 50, through branch inlet conduit 44 to heat exchanger 12 and from heat exchanger 12 through branch outlet conduit 46 to return conduit 52 whereby the air within the conditioned space 16 is cooled. When the temperature within condition space 16 is sufficiently cooled, switch 85 of thermostat 74 will move to the position shown in solid line thereby establishing a second circuit including switch 92 of fan control 82, switch 85 of thermostat 74, switch 83 of thermostat 76, and solenoid 41 of solenoid valve 40 thereby opening solenoid valve 40 to allow domestic warm water to pass from supply conduit 32, through branch inlet conduit 38 to heat exchanger 14, and from heat exchanger 14 to branch outlet conduit 42 back to return conduit 34. The air being circulated by fan 18 is reduced in temperature below the due point thereof as it passes over heat exchanger 12 and is accordingly reduced in humidity. The thus-dehumidified air is then raised to a normal temperature by heat exchange with the domestic hot water passing within heat exchanger 14. Should the demand for domestic hot water including that used in zones 16 for purposes of dehumidification exceed the supply as provided by hot water heater 26, the temperature within hot water supply conduit 30 will be lowered to a minimum set point at which temperature thermostat switch 33 will be closed thereby energizing each of relays 80 and opening switches 81 thereof. The opening of switch 81 thus deenergizes the aforedescribed circuit including solenoid 69 thereby closing valve 68. The air passing over heat exchangers 12 and 14 will then be heated only by the operation of heat exchanger 14. As the temperature within the conditioned space reaches a predetermined value switch 85 will be moved to the dotted line position (switch 86 remains in the solid line position) thereby interrupting the circuit including solenoid 41 and closing valve 40 thereby turning down the domestic hot water for purposes of dehumidification. Should the supply of domestic hot water increase above the demand the temperature will again rise to open thermostat 33 thereby deenergizing relays 80 and closing switches 81. The closure of switches 81 again establishes the circuit including switch 92 of fan control 82, switch 81 of relay 80, humidistat switch 35, switch 84 of thermostat 76, and solenoid 69 of solenoid valve 68. As aforedescribed the system will cool the conditioned space 16 until switch 85 of thermostat 74 moves to the solid line position thereby establishing a second circuit including switch 92 of fan control 82, switch 85 of thermostat 74, switch 83 of thermostat 76, and solenoid 41 of solenoid valve 40 to thereby open solenoid valve 40 and again circulate domestic hot water in heat exchanger 14 for purposes of dehumidification. When the demand for dehumidification is satisfied humidistat switch 35 will be opened and the solenoids 69 and 41 will be deenergized in the same manner as aforedescribed in connection with the opening of switch 81.

Thus it will be seen that I have provided an air-conditioning system having a primary heating and cooling heat exchanger and an auxiliary domestic hot-water heated second heat exchanger, with controls to permit main-season heating, cooling, off-season heating, and dehumidifying of a conditioned space, the off-season heating and the dehumidifying being accomplished through the use of domestic hot water.

Furthermore, it will be seen that by using the domestic hot water heat exchanger during the cooling season as a reheater for purposes of dehumidification, long periods of domestic water storage in the secondary exchanger are avoided.

Further toward this end, a shunt between terminal *b* of thermostat 76 and terminal *a* of thermostat 74 as shown by dashed line 99 in FIG. 2 may be provided to open valve 40 any time valve 68 is opened to conduct warm water thereby avoiding long periods of domestic water storage in the secondary heat exchanger during the heating season. Thus, domestic water may be periodically circulated through the secondary heat exchanger during all seasons thereby avoiding objectionably long periods of domestic water storage.

Having now described the preferred embodiment of my invention I contemplate that many changes may be made without departing from the scope or spirit of my invention, and I accordingly desire to be limited only by the claims.

I claim:

1. Apparatus for air conditioning a space comprising: a first heat exchanger adapted to conduct chilled and warm heat exchange liquid therethrough for cooling and heating said space; a second heat exchanger adapted to conduct warm heat exchange liquid therethrough for heating said space; a source of chilled heat exchange liquid for said first heat exchanger; a source of warm heat exchange liquid for said first heat exchanger; a source of warm heat exchange liquid for said second heat exchanger; first conduit means for conducting heat exchange liquid from said source of chilled heat exchange liquid and from said source of warm heat exchange liquid for said first heat exchanger to the inlet of said first heat exchanger; second conduit means for conducting warm heat exchange liquid from said source of warm heat exchange liquid for said second heat exchanger to the inlet of said second heat exchanger; first valve means for interrupting the flow of heat exchange liquid through said first heat exchanger; second valve means for interrupting the flow of heat exchange liquid through said second heat exchanger; fan means for passing air for the conditioned space in heat exchange relationship with said first and second heat exchangers; means for maintaining said first valve means open in response to a first condition of simultaneous demand for heating said space and the presence of warm heat exchange liquid in said first conduit means; means for maintaining said first valve means open and said second valve means closed in response to a second condition of simultaneous demand for cooling said space and the presence of chilled heat exchange liquid in said first conduit means; means for maintaining said second valve means open and said first valve means closed in response to a third condition of simultaneous demand for heating said space and the presence of chilled heat exchange liquid in said first conduit means; and means for opening said first and second valve means in response to a fourth condition of simultaneous demand for dehumidifying said space and the presence of chilled heat exchange liquid in said first conduit means.

2. Apparatus for air conditioning a space comprising: a first heat exchanger adapted to conduct chilled and warm heat exchange liquid therethrough for cooling and heating said space; a second heat exchanger adapted to conduct warm heat exchange liquid therethrough for heating said space; a source of chilled heat exchange liquid for said first heat exchanger; a source of warm heat exchange liquid for said first heat exchanger; a source of warm heat exchange liquid for said second heat exchanger; first conduit means for conducting heat exchange liquid from said source of chilled heat exchange liquid and from said source of warm heat exchange liquid for said first heat exchanger to the inlet of said first heat exchanger; second conduit means for conducting warm heat exchange liquid from said source of warm heat exchange liquid for said second heat exchanger to the inlet of said second heat exchanger; first valve means for interrupting the flow of heat exchange liquid through said first heat exchanger; second valve means for interrupting the flow of heat exchange liquid through said second heat exchanger; fan means for passing air for the conditioned space in heat exchange relationship with said first and second heat exchangers; means for maintaining said first valve means open in response to a first condition of simultaneous demand for heating said space and the presence of warm heat exchange liquid in said first conduit means; means for maintaining said first valve means open and said second valve means closed in response to a second condition of simultaneous demand for cooling said space and the presence of chilled heat exchange liquid in said first conduit means; means for maintaining said second valve means open and said first valve means closed in response to a third condition of simultaneous demand for heating said space and the presence of chilled heat exchange liquid in said first conduit means; means for opening said first valve means in response to a fourth condition of simultaneous demand for dehumidifying said space and the presence of chilled heat exchange liquid in said first conduit means whereby said space is cooled; and means for opening said second valve in response to a fifth condition of simultaneous demand for dehumidifying and heating said space.

3. The apparatus as defined by claim 2 wherein said source of warm heat exchange liquid for said second heat exchanger is a domestic warm water supply and including means for rendering ineffective said means for opening said second valve in response to said fifth condition in response to a demand on said domestic warm water supply in excess of a predetermined value.

4. Apparatus for air conditioning a space comprising: a first heat exchanger adapted to conduct chilled and warm heat exchange liquid therethrough for cooling and heating said space respectively; a second heat exchanger for heating said space; a source of chilled heat exchange liquid for said first heat exchanger; a source of warm heat exchange liquid for said first heat exchanger; a source of energy for said second heat exchanger; conduit means for conducting heat exchange liquid from said source of chilled heat exchange liquid and from said source of warm heat exchange liquid to the inlet of said first heat exchanger; means for conveying energy from said source of energy to said second heat exchanger; valve means for interrupting the flow of heat exchange liquid through said first heat exchanger; second means for interrupting the supply of energy to said second heat exchanger; fan means for passing air for the conditioned space in heat exchange relationship with said first and second heat exchangers; means for maintaining said valve means open in response to a first condition of simultaneous demand for heating said space and the presence of warm heat exchange liquid in said conduit means; means for maintaining said valve means open and said second means in its interrupting condition in response to a second condition of simultaneous demand for cooling said space and the presence of chilled heat exchange liquid in said conduit means; means for rendering said second means ineffective and said valve means closed in response to a third condition of simultaneous demand for heating said space and the presence of chilled heat exchange liquid in said conduit means; and means for maintaining said valve means open and rendering said second means ineffective in response to a fourth condition of simultaneous demand for heating and dehumidifying said space and the presence of chilled heat exchange liquid in said conduit means.

5. Apparatus for air conditioning a space comprising: a first heat exchanger adapted to conduct chilled and warm heat exchange liquid therethrough for cooling and heating said space; a second heat exchanger adapted to conduct warm heat exchange liquid therethrough for heating said space; a source of chilled heat exchange liquid for said first heat exchanger; a source of warm heat exchange liquid for said first heat exchanger; a source of warm heat exchange liquid for said second heat exchanger; first conduit means for conducting heat exchange liquid from said source of chilled heat exchange liquid and from said source of warm heat exchange liquid for said first heat exchanger to the inlet of said first heat exchanger; second conduit means for conducting warm heat exchange liquid from said source of warm heat exchange liquid for said second heat exchanger to the inlet of said second heat exchanger; first valve means for interrupting the flow of heat exchange liquid through said first heat exchanger; second valve means for interrupting the flow of heat exchange liquid through said second heat exchanger; fan means for passing air for the conditioned space in heat exchange relationship with said first and second heat exchangers means for maintaining said first and second valve means open in response to a first condition of simultaneous demand for heating said space and the presence of warm heat exchange liquid in said first conduit means; means for maintaining said first valve means open and said second valve means closed in response to a second condition of simultaneous demand for cooling said space and the presence of chilled heat exchange liquid in said first conduit means; means for maintaining said second valve means open and said first valve means closed in response to a third condition of simultaneous demand for heating said space and the presence of chilled heat exchange liquid in said first conduit means; and means for opening said first and second valve means in response to a fourth condition of simultaneous demand for dehumidifying said space and the presence of chilled heat exchange liquid in said first conduit means.

6. Apparatus for air conditioning a space comprising: a first heat exchanger adapted to conduct chilled and warm heat exchange liquid therethrough for cooling and heating said space; a second heat exchanger adapted to conduct warm heat exchange liquid therethrough for heating said space; a source of chilled heat exchange liquid for said first heat exchanger; a source of warm heat exchange liquid for said first heat exchanger; a source of warm heat exchange liquid for said second heat exchanger; first conduit means for conducting heat exchange liquid from said source of chilled heat exchange liquid and from said source of warm heat exchange liquid for said first heat exchanger to the inlet of said first heat exchanger; second conduit means for conducting warm heat exchange liquid from said source of warm heat exchange liquid for said second heat exchanger to the inlet of said second heat exchanger; first valve means for interrupting the flow of heat exchange liquid through said first heat exchanger; second valve means for interrupting the flow of heat exchange liquid through said second heat exchanger; fan means for passing air for the conditioned space in heat exchange relationship with said first and second heat exchangers; means for maintaining said first and second valve means open in response to a first condition of simultaneous demand for heating said space and the presence of warm heat exchange liquid in said first conduit means; means for maintaining said first valve means open and said second valve means closed in response to a second condition of simultaneous demand for cooling said space and the presence of chilled heat exchange liquid in said first conduit means; means for maintaining said second valve means open and said first valve means closed in response to a third condition of simultaneous demand for heating said space and the presence of chilled heat exchange liquid in said first conduit means; means for opening said first valve means in response to a fourth condition of simultaneous demand for dehumidifying said space and the presence of chilled heat exchange liquid in said first conduit means whereby said space is cooled; and means for opening said second valve in response to a fifth condition of simultaneous demand for dehumidifying and heating said space.

7. The apparatus as defined by claim 6 wherein said source of warm heat exchange liquid for said second heat exchanger is a domestic warm water supply and including means for rendering ineffective said means for opening said second valve in response to said fifth condition in response to a demand on said domestic warm water supply in excess of a predetermined value.

8. Apparatus for air conditioning a space of a building comprising: a first heat exchanger adapted to conduct chilled and warm heat exchanger liquid therethrough for cooling and heating said space; a second heat exchanger adapted to conduct warm heat exchange liquid therethrough for heating said space; a first source of chilled water for said first heat exchanger; a second source of domestic hot water for said second heat exchanger; a third source of hot water for said first heat exchanger; first conduit means for conducting heat exchange liquid from said first source of chilled water and from said third source of hot water to the inlet of said first heat exchanger; second conduit means for conducting hot water from said source of domestic hot water to the inlet of said second heat exchanger; first valve means for interrupting the flow of heat exchange liquid through said first heat exchanger; second valve means for interrupting the flow of heat exchange liquid to said second heat exchanger; fan means for passing air for the conditioned space in heat exchange relationship with said first and second heat exchangers; means for maintaining said first and second valve means open in response to a first condition of simultaneous demand for heating said space and the presence of warm heat exchange liquid in said first conduit means; means for maintaining said first valve means closed and said second valve means open in response to a second condition of simultaneous demand for heating said space and the presence of chilled water in said first conduit means; means for maintaining said first valve means open and said second valve means closed in response to a third condition of simultaneous demand for cooling said space and the presence of chilled water in said first conduit means; and means for maintaining said first and second valve means open in response to a fourth condition of a demand for dehumidification whereby domestic hot water may be passed through the second heat exchanger during the main heating season when said first heat exchanger is operating as a heater, during the intermediate seasons when said second heat exchanger is operated as a heater, and during the cooling season when said second heat exchanger is periodically operated as a reheater during periods of dehumidification and thus whereby domestic hot water is caused to flow at least periodically through said second heat exchanger during the main heating season, the main cooling season and the intermediate seasons.

* * * * *